United States Patent
Sagar et al.

(10) Patent No.: US 10,999,132 B1
(45) Date of Patent: May 4, 2021

(54) DETECTING DEGRADED NETWORK MONITORING AGENTS

(71) Applicant: Amazon Technologies, Inc., Seattle, WA (US)

(72) Inventors: Gaurav Sagar, Seattle, WA (US); Michael Collins, Seattle, WA (US); Mike Dang Nguyen, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 215 days.

(21) Appl. No.: 15/793,477

(22) Filed: Oct. 25, 2017

(51) Int. Cl.
*H04L 12/24* (2006.01)
*H04L 12/26* (2006.01)

(52) U.S. Cl.
CPC ...... *H04L 41/0695* (2013.01); *H04L 41/0677* (2013.01); *H04L 43/0823* (2013.01); *H04L 43/16* (2013.01); *H04L 43/06* (2013.01); *H04L 43/0852* (2013.01); *H04L 43/0876* (2013.01)

(58) Field of Classification Search
CPC ...................................................... H04L 43/08
See application file for complete search history.

(56) References Cited

U.S. PATENT DOCUMENTS

| | | | | |
|---|---|---|---|---|
| 7,742,413 B1* | 6/2010 | Bugenhagen | ......... | H04L 43/026 370/231 |
| 2004/0054766 A1* | 3/2004 | Vicente | ............... | H04L 41/5009 709/223 |
| 2004/0156363 A1* | 8/2004 | Walls | .................... | H04L 49/103 370/389 |
| 2005/0228880 A1* | 10/2005 | Champlin | ........... | G06F 11/3447 709/224 |
| 2006/0098625 A1* | 5/2006 | King | ....................... | H04L 65/80 370/352 |
| 2008/0115014 A1* | 5/2008 | Vaidyanathan | ........ | G06F 11/008 714/42 |
| 2012/0294164 A1* | 11/2012 | Leventu | .............. | H04L 43/0829 370/252 |
| 2016/0165472 A1* | 6/2016 | Gopalakrishnan | .... | H04W 24/10 455/67.11 |
| 2017/0139411 A1* | 5/2017 | Hartung | ............... | G05D 1/0077 |
| 2017/0278524 A1* | 9/2017 | Fukuda | ................. | G10L 21/028 |
| 2018/0267558 A1* | 9/2018 | Tiwari | ................. | G05D 1/0246 |

* cited by examiner

*Primary Examiner* — Ario Etienne
*Assistant Examiner* — Sm Z Islam
(74) *Attorney, Agent, or Firm* — Klarquist Sparkman, LLP

(57) ABSTRACT

Technologies are provided for identifying problems with network monitoring agents. For example, a network monitoring agent that is experiencing network packet loss can be examined to determine if it is degraded. For example, metrics can be obtained that are associated with the network monitoring agent. The obtained metrics can then be evaluated against thresholds. For example, if a high confidence metric is outside of a threshold for the high confidence metric, then a determination can be made that the network monitoring agent is degraded. As another example, if two low confidence metrics are outside of respective thresholds, then a determination can be made that the network monitoring agent is degraded. If a network monitoring agent is degraded, then its monitoring data can be discarded.

19 Claims, 7 Drawing Sheets

DETECTING DEGRADED NETWORK MONITORING AGENTS

BACKGROUND

An organization that provides services via the Internet relies on the Internet to connect with users of its services. If there are problems along the path within the Internet (e.g., network problems, routing problems, congestion, etc.) between the organization's network and the users, then the users may experience problems accessing the services of the organization (e.g., service interruptions or slowdowns). Locating the source of such problems can be difficult.

In some cases, network operators monitor the network using test packets to try to locate the source of a problem. For example, network monitoring can be performed by specialized agents that send the test packets to try to identify the network problems. While monitoring the network can be effective at identifying network problems, there are situations where such monitoring can provide unreliable or incorrect results. For example, if an agent is providing unreliable or incorrect data, then identifying network problems can be difficult (e.g., actual network problems may go undetected, false positives may be produced, etc.).

DETAILED DESCRIPTION

Figure 1:
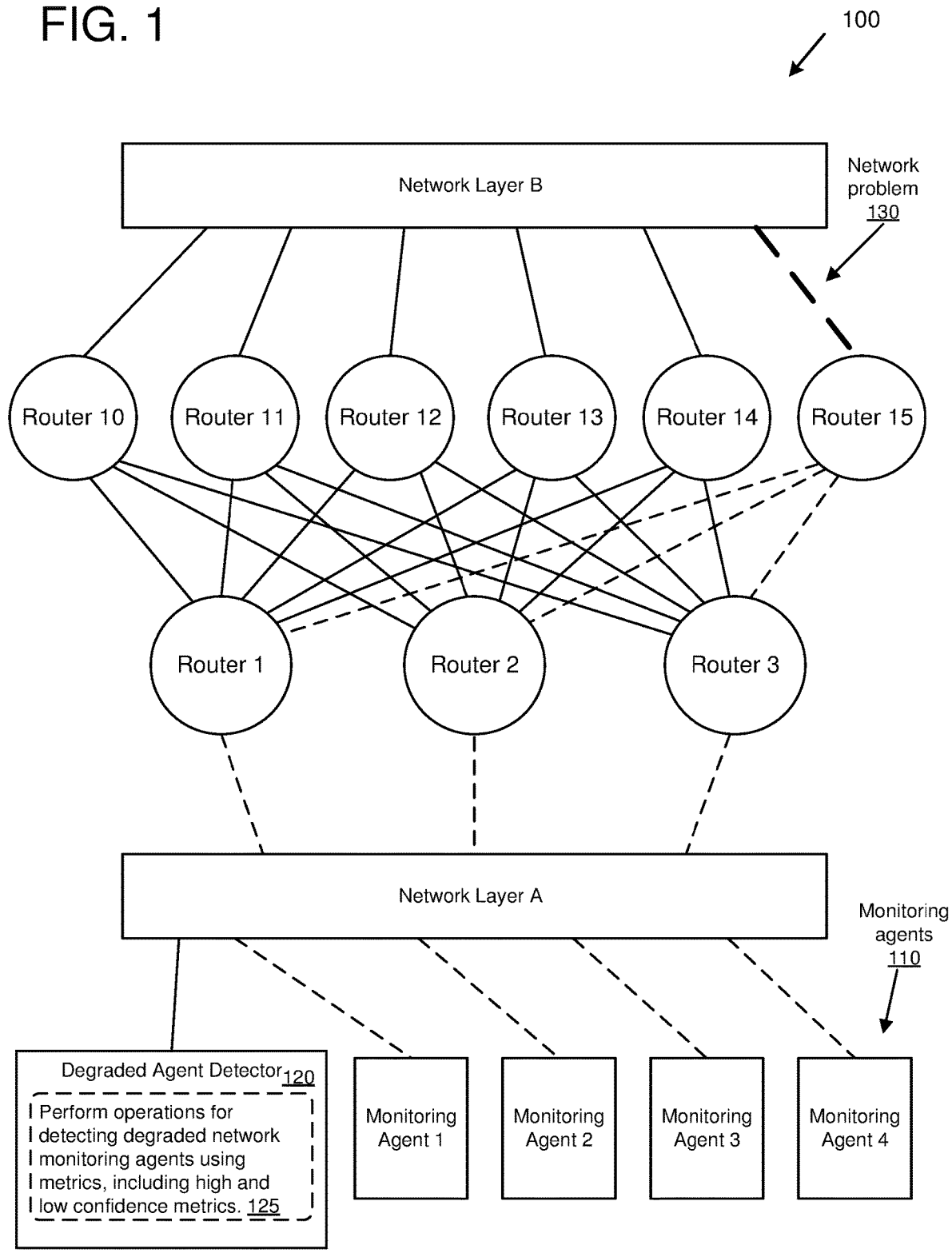
FIG. 1 is a diagram of an example network environment within which degraded network monitoring agents can be detected.

The following description is directed to technologies for identifying problems with network monitoring agents. For example, a network monitoring agent that is experiencing network packet loss (e.g., above a threshold value) can be examined to determine if it is operating correctly (e.g., to determine if its network packet loss metric should be used to identify network problems or discarded as unreliable). For example, metrics can be obtained that are associated with the network monitoring agent (e.g., high confidence metrics, low confidence metrics, application metrics, and/or host metrics). The obtained metrics can then be evaluated against thresholds. For example, if a high confidence metric is outside of a threshold for the high confidence metric, then a determination can be made that the network monitoring agent is degraded. As another example, if at least two low confidence metrics are outside of respective thresholds, and the same at least two low confidence metrics are inside of the respective thresholds for other network monitoring agents, then a determination can be made that the network monitoring agent is degraded. If a network monitoring agent is degraded, then its monitoring data can be discarded. Discarded monitoring data can include packet loss data, latency data, and/or other monitoring data that can be used for identifying problems on the network.

Network monitoring agents are software and/or hardware resources that monitor operation of a computer network. For example, network monitoring agents can monitor network traffic (e.g., by sending and/or receiving network packets, such as test packets or probe packets) in order to identify and locate the sources of problems on the network (e.g., network link problems, routing problems, congestion, etc.). In some embodiments, the network monitoring agent is a software program running on a server or other device connected to the network.

In some implementations, a collection of network monitoring agents monitor the same part of a computer network (e.g., the scope of monitoring is the same for the network monitoring agents so that they monitor the same collection of network devices and network links). For example, an organization may operate a computer network comprising many networking devices (e.g., routers and/or switches) organized into various topologies (e.g., into a number of network fabrics). The network monitoring agents can monitor the part of the computer network by sending network packets through the part of the computer network (e.g., to destination devices at the edge, or outside, of the part of the computer network). If network packet loss is detected (e.g., via ping packets), which indicates a potential problem with the network, then other types of packets (e.g., traceroute packets) can be used by the network monitoring agents to determine the location (e.g., triangulate) the source of the network problem (e.g., to a particular network link and/or to particular networking devices).

A network monitoring agent that is not operating correctly (i.e., is degraded) can disrupt network monitoring activities. For example, a degraded network monitoring agent can incorrectly report the amount of network packet loss it is observing on the network (e.g., by over reporting or under reporting the amount of network packet loss). A degraded network monitoring agent can also cause network packet loss itself (e.g., due to a software or hardware problem, or due to a misconfiguration). A degraded network monitoring agent can also report that traceroutes are failing at some point on the network from the point of view of the agent when in fact the traceroutes are not actually failing. If monitoring data from a degraded network monitoring agent is used in determining network problems, then the results of the analysis can be unreliable. For example, use of monitoring data from a degraded network monitoring agent (e.g., alone or in combination with monitoring data from other network monitoring agents) can lead to incorrect results (e.g., detection of network problems that do not exist, difficulty in identifying and/or locating actual network problems, etc.).

In order to identify network monitoring agents that are not operating correctly, a variety of metrics can be evaluated. The metrics can include host metrics and/or application metrics. If the metrics indicate that a particular network monitoring agent is degraded (not operating correctly), then the monitoring data from the particular network monitoring agent can be discarded (e.g., as potentially unreliable data) or otherwise not used in trying to identify problems on the computer network. For example, if there are a number of network monitoring agents monitoring a specific part of the computer network, then only the monitoring data from those network monitoring agents that are not degraded can be retained and used for identifying problems on the computer network.

In some implementations, application metrics are used in identifying network monitoring agents that are degraded. Application metrics can be used alone or in combination with host metrics. Application metrics refer to metrics that are related to the software (e.g., to the network monitoring agent software and/or to other software) running on the computing device (or computing devices). Application metrics can include, for example, latency of network packets (e.g., a measure of network packet latency), total network packets sent, total network packets lost, number of partial traceroutes, number of healthy traceroutes, unknown packets received (e.g., network packets of an unknown or unexpected type, which could be caused by a misconfiguration of the agent or host), and cycle duration (e.g., in seconds).

In some implementations, host metrics are used in identifying network monitoring agents that have degraded. Host metrics can be used alone or in combination with application metrics. Host metrics refer to metrics that are related to the computing device (or computing devices) on which the monitoring agent is running. Host metrics can include, for example, processor utilization (e.g., central processing unit (CPU) utilization percentage), physical memory utilization (e.g., the amount of physical memory used by the monitoring agent), and context switches (e.g., involuntary and/or voluntary context switches).

In some implementations, metrics are categorized as high confidence metrics and low confidence metrics. High confidence metrics are those metrics that can indicate a degraded network monitoring agent with a high degree of confidence (e.g., those metrics that are more closely correlated with a degraded network monitoring agent). Low confidence metrics are those metrics that indicate a degraded network monitoring agent with a low degree of confidence (e.g., those metrics that are less closely correlated with a degraded network monitoring agent, but could still be useful in detecting a degraded network monitoring agent in combination with other information).

In some implementations, if a single high confidence metric for a particular network monitoring agent is outside of its threshold, then the network monitoring agent is considered degraded. For example, if the number of dropped packets is considered a high confidence metric, and the number of dropped packets for a particular network monitoring agent is above a threshold (e.g., a threshold number of dropped packets for a given time interval), then the network monitoring agent can be considered degraded.

In some implementations, a single low confidence metric is not sufficient, by itself, to determine that a network monitoring agent is degraded. However, in some implementations, if two or more low confidence metrics are outside of their respective thresholds, then the network monitoring agent is considered degraded. For example, if CPU utilization is above a CPU utilization threshold and memory utilization is above a memory utilization threshold for the computing device of a particular network monitoring agent, then the network monitoring agent can be considered degraded. In some implementations, the same two or more low confidence metrics are also evaluated for other network monitoring agents before determining that the network monitoring agent is degraded. For example, if the same two low confidence metrics for the other network monitoring agents are inside of the respective thresholds, then the network monitoring agent is determined to be degraded, and if the same two low confidence metrics for the other network monitoring agents are outside of the respective thresholds, then the network monitoring agent is not determined to be degraded.

In order to determine if a metric indicates a potential problem with a network monitoring agent, the metric is compared to a threshold that is specific to the metric. In some implementations, the threshold for a metric is threshold percentile determined from a distribution (e.g., a normal distribution, a Poisson distribution, or another type of distribution). The distribution can be generated automatically (e.g., from metric data from the network monitoring agent and/or from other network monitoring agents). The distributions can be specific to a specific network monitoring agent or to a collection of network monitoring agents. For example, a distribution for each of a number of metrics can be generated for each of a collection of network monitoring agents that are monitoring the same part of the computer network. For example, a distribution for a CPU utilization metric can be generated for a specific network monitoring agent from past CPU utilization data produced by the specific network monitoring agent (e.g., over the last period of time, such as the last 6 hours or the last 24 hours). Each of the distributions can be evaluated to determine a threshold percentile that is specific to the distribution. The threshold percentile can be selected to distinguish between normal (e.g., expected) values and abnormal (e.g., unexpected) values. In some implementations, the threshold percentile is the ninety-seventh (97) percentile, but other percentiles can be used as well. In addition, each metric and can have a different threshold percentile for each network monitoring agent. In some implementations, the threshold for a metric is some value other than a threshold percentile. For example, a threshold value or a threshold ratio can be used.

FIG. 1 is a diagram of an example network environment 100 within which degraded network monitoring agents can be detected. In the example network environment 100, collections of network devices are depicted. The collections of network devices include network devices (e.g., routers, switches, and/or other network devices) at a first layer of the network (called network layer A), a number of network devices at a second layer of the network (called network layer B), and a number of network routers (routers 1-3 and routers 10-15) in between.

For example, the network devices can be part of a computer network of an organization (e.g., part of a network that services a data center of the organization). The network devices can be organized into layers such that different layers provide different functionality within the computer network. For example, network devices can be organized into aggregation layers, distribution layers, transit layers, border layers, etc.

For example, the network devices depicted in the example network environment 100 can represent some of the network layers that service a data center (or part of a data center) for an organization. For example, computing devices (e.g., servers computers, desktop computers, database systems, storage systems, etc.) can be connected to network devices at one of the layers (e.g., at network layer A) and access the Internet or other external networks via another one of the layers (e.g., network layer B).

Also depicted in the example network environment 100 are monitoring agents 110 (also called network monitoring agents). Specifically, there are four monitoring agents depicted (monitoring agents 1-4). However, there can be more, or fewer, monitoring agents (e.g., depending on the size of the network and/or other considerations). The monitoring agents 110 send network packets (e.g., test packets, which can comprise ping and/or traceroute packets) through the computer network in order to detect and/or locate network problems. In the example network environment 100, there is a network problem 130, which is the network link between router 15 and a network device in network layer B. The monitoring agents 110 have detected the network problem 130 and triangulated its position. The affected network paths upon which the network problem has been detected are depicted as dashed lines.

Also depicted in the example network environment 100 is a degraded agent detector 120. The degraded agent detector 120 can comprise software and/or hardware resources. In some implementations, the degraded agent detector 120 is a software component running on a computing device. The degraded agent detector 120 performs operations for detecting degraded network monitoring agents using metrics (e.g., high confidence metrics and/or low confidence metrics), as depicted at 125. For example, the degraded agent detector 120 can obtain metrics from the monitoring agents 110 (e.g., application metrics associated with the monitoring agent software and/or host metrics associated with the computing devices on which the monitoring agents are running), analyze the obtained metrics, and determine if any of the monitoring agents are degraded. In the example network environment 100, the degraded agent detector 120 is located with the monitoring agents. However, the degraded agent detector 120 is not limited to being located with the monitoring agents, and can be located anywhere in the computer network.

Figure 2:
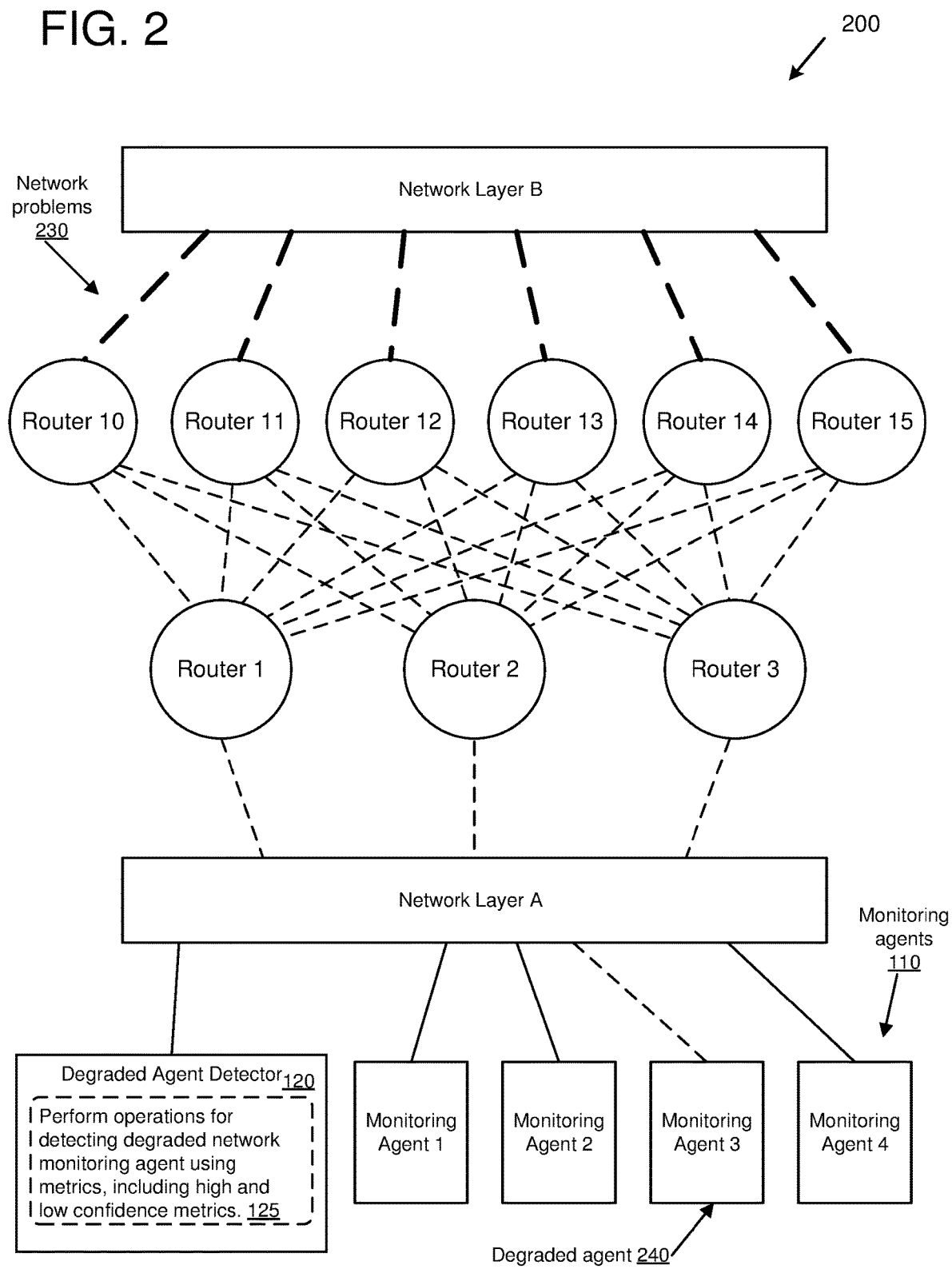
FIG. 2 is a diagram of an example network environment in which a degraded network monitoring agent has been detected.

FIG. 2 is a diagram of an example network environment 200 in which a degraded network monitoring agent has been detected. The example network environment 200 contains the same network devices and topology as the example network environment 100. However, in the example network environment 200, monitoring agent 3 is degraded, as depicted at 240. When the monitoring data from monitoring agent 3 is used to identify problems on the network (e.g., alone or in combination with the other monitoring agents 1, 3, and 4), then network problems are detected between routers 10-15 and network layer B, as depicted at 230. However, the network problems depicted at 230 are being identified based on the unreliable monitoring data provided by monitoring agent 3, and in reality there may not be any problems with the network.

The degraded agent detector 120 can determine that monitoring agent 3 is degraded (e.g., based on evaluating metrics from monitoring agent 3 against thresholds). Once it is determined that monitoring agent 3 is degraded, then the monitoring data from monitoring agent 3 can be discarded.

Various types of metrics can be used, alone or in combination, to determine whether a monitoring agent is degraded (e.g., resulting in discarding of the monitoring agent's monitoring data). The metrics can comprise high confidence metrics and/or low confidence metrics. The metrics can also comprise application metrics (e.g., which could be high confidence and/or low confidence metrics) and/or host metrics (e.g., which could be high confidence and/or low confidence metrics).

One example metric is a number of dropped packets metric. The number of dropped packets metric refers to the number of network packets that were dropped because there was no room in the operating system's buffer when they arrived at the computing device on which the monitoring agent was running (e.g., because the monitoring agent or associated software was not reading the buffer quickly enough). In some implementations, the number of dropped packets metric is a high confidence metric and is obtained from the application (e.g., from the network monitoring agent). In some implementations, the threshold for the number of dropped packets metric is zero. Therefore, if there are any dropped packets (e.g., within a time period), then the metric would be outside the threshold value. For example, if there are more than zero dropped packets in a one-minute time window, then this metric would be outside (in this example above) the threshold value.

Another example metric is a pong-ping ratio metric. The pong-ping ratio metric refers to the ratio of callbacks to network packet send requests between components of the network monitoring agent and/or associated software or hardware. For example, when a component of the network monitoring agent requests that a network packet be sent via a network interface (the "ping"), the request is communicated to another component of the network monitoring agent that interacts with the network interface (e.g., a packet injection library). A corresponding callback will then be returned (the "pong") from the component of the network monitoring agent that interacts with the network interface. The callback can provide the actual response from the network if a response was received or indicate that a response was not received from the network. If the network monitoring agent is operating correctly, then the ratio of network packet send requests to corresponding callbacks will be one (a one-to-one ratio). If the ratio is other than one, there may be a problem with the network monitoring agent (e.g., that responses from the network are being dropped somewhere within the network monitoring agent). In some implementations, the pong-ping ratio metric is a high confidence metric and is obtained from the application (e.g., from the network monitoring agent). In some implementations, the threshold for the pong-ping ratio is one (a ratio of other than one would be outside the threshold).

Another example metric is a number of context switches metric. The number of context switches metric refers to the number of times the CPU switches between processes or threads. A relatively high number of context switches can indicate a problem with the network monitoring agent and/or other software running on the computing device. In some implementations, the number of context switches metric is a low confidence metric and is obtained from the host. In some implementations, the threshold for the number of context switches metric is a threshold percentile determined based on a distribution generated previous data from the network monitoring agent and/or from other network monitoring agents. The distribution can be generated over a period of time (e.g., from values of the context switch metric obtained during the last 6 hours or the last 24 hours). In some implementations, the threshold percentile is the $95^{th}$ percentile. For example, if the number of context switches metric for a specific network monitoring agent is above the $95^{th}$ percentile, then the metric for the specific monitoring agent would be outside the threshold.

Another example metric is a network packet latency metric. The network packet latency metric refers to a percentile of the latency of network packets (e.g., ping packets) sent by the network monitoring agent. In some implementations, the percentile of latency is the $90^{th}$ percentile (also called the p90 of latency). A relatively high network packet latency can indicate a problem with the network monitoring agent and/or other software running on the computing device. In some implementations, the network packet latency metric is a low confidence metric and is obtained from the application. In some implementations, the threshold for the network packet latency metric is a threshold percentile determined based on a distribution generated previous data from the network monitoring agent and/or from other network monitoring agents. The distribution can be generated over a period of time (e.g., from values of the network packet latency metric obtained during the last 6 hours). In some implementations, the threshold percentile is the 95$^{th}$ percentile. For example, if the p90 of latency for a specific network monitoring agent is above the 95$^{th}$ percentile threshold (which is based on the distribution generated from p90 of latency values), then the metric for the specific monitoring agent would be outside the threshold.

Another example metric is a network packet cycle duration metric. The network packet cycle duration metric refers to the time (e.g., in milliseconds) taken by the network monitoring agent to send the network packets to the destination device and receive response packets. A relatively high network packet cycle duration can indicate a problem with the network monitoring agent and/or other software running on the computing device. In some implementations, the network packet cycle duration metric is a low confidence metric and is obtained from the application. In some implementations, the threshold for the network packet cycle duration metric is a threshold percentile determined based on a distribution generated previous data from the network monitoring agent and/or from other network monitoring agents. The distribution can be generated over a period of time (e.g., from values of the network packet cycle duration metric obtained during the last 6 hours). In some implementations, the threshold percentile is the 95$^{th}$ percentile. For example, if the network packet cycle duration metric for a specific network monitoring agent is above the 95$^{th}$ percentile, then the metric for the specific monitoring agent would be outside the threshold.

Another example metric is a processor utilization (e.g., CPU utilization) metric. The processor utilization metric refers to how much of the processor's time is busy versus idle (e.g., expressed as a percentage, such as 60% utilized, which could be an instantaneous value or an averaged value over a period of time). Relatively high processor utilization can indicate a problem with the network monitoring agent and/or other software running on the computing device. In some implementations, the processor utilization metric is a low confidence metric and is obtained from the host. In some implementations, the threshold for the processor utilization metric is a threshold percentile distribution generated previous data from the network monitoring agent and/or from other network monitoring agents. The distribution can be generated over a period of time (e.g., from values of the processor utilization metric obtained during the last 6 hours). In some implementations, the threshold percentile is the 95$^{th}$ percentile. For example, if the processor utilization metric for a specific network monitoring agent is above the 95$^{th}$ percentile, then the metric for the specific monitoring agent would be outside the threshold.

Another example metric is a memory utilization metric. The memory utilization metric refers to how much of the memory (e.g., RAM) is being used on the computing device running the network monitoring agent (e.g., expressed as a percentage, such as 45% used, which could be an instantaneous value or an averaged value over a period of time). Relatively high memory utilization can indicate a problem with the network monitoring agent and/or other software running on the computing device. In some implementations, the memory utilization metric is a low confidence metric and is obtained from the host. In some implementations, the threshold for the memory utilization metric is a threshold percentile distribution generated previous data from the network monitoring agent and/or from other network monitoring agents. The distribution can be generated over a period of time (e.g., from values of the memory utilization metric obtained during the last 6 hours). In some implementations, the threshold percentile is the 95$^{th}$ percentile. For example, if the memory utilization metric for a specific network monitoring agent is above the 95$^{th}$ percentile, then the metric for the specific monitoring agent would be outside the threshold.

In some implementations, a network monitoring agent is evaluated to determine if it is degraded based on an indication of network packet loss by the network monitoring agent. For example, a service of the network environment (e.g., the degraded agent detector 120) can check the network monitoring agents on a periodic basis (e.g., every minute) to see if any of the network monitoring agents are experiencing network packet loss. The network monitoring agents can also alert the service if they experiencing network packet loss. If an indication of network packet loss is received (e.g., either directly from a network monitoring agent or by querying the network monitoring agent), then metrics for the network monitoring agent can be checked. In some implementations, if a network monitoring agent is experiencing network packet loss above a threshold value (e.g., over 10% network packet loss) for a period of time (e.g., over 10% for three minutes in a five minute window), then the network monitoring agent will be evaluated to determine if it is degraded.

In some implementations, evaluation of the network monitoring agent (after receiving the indication of network packet loss) involves examining one or more metrics associated with the network monitoring agent. Metrics that are associated with the network monitoring agent can include metrics that the network monitoring agent collects as part of its network monitoring activity (e.g., network packet loss, latency, etc.) and/or metrics that are associated with the operation of the network monitoring agent or the computing device on which the network monitoring agent runs (e.g., context switches, memory utilization, CPU utilization, dropped packets, etc.). In some implementations, a network monitoring agent can be determined to be degraded if one high confidence metric is outside of its threshold value (e.g., if the number of dropped packets metric is more than zero). In some implementations, a network monitoring agent can be determined to be degraded if two or more low confidence metrics are outside of their respective threshold values. In some implementations, the metrics are evaluated over a time period. For example, the metrics can be evaluated for a five minute window, and if either one high confidence metric is outside of its threshold value, or two or more low confidence metrics are outside of their threshold values, for at least three minutes out of the five minute window, then the network monitoring agent can be determined to be degraded.

Figure 3:
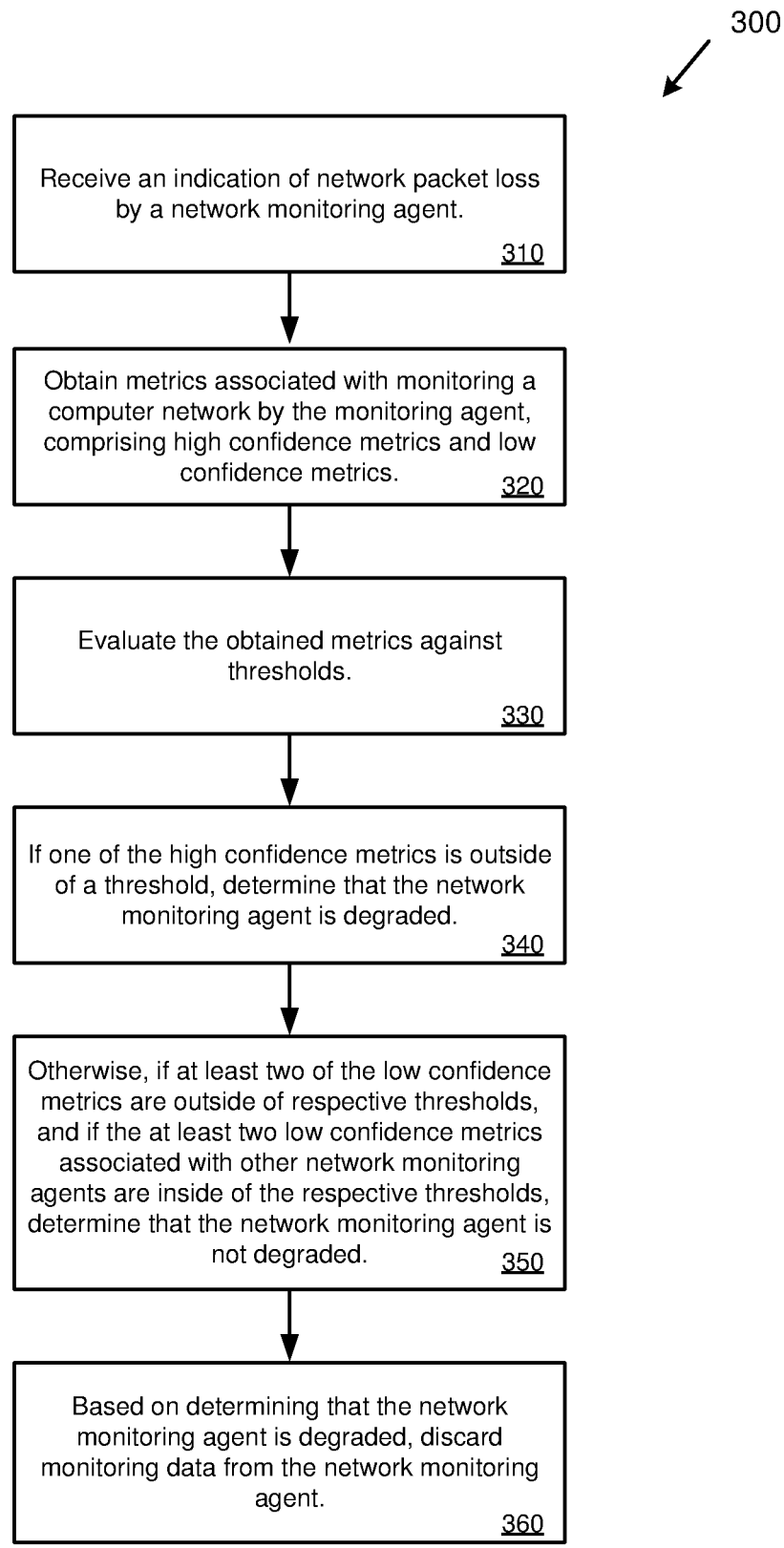
FIGS. 3, 4, and 5 are flowcharts of example methods for detecting degraded network monitoring agents.

FIG. 3 is a flow chart of an example method 300 for determining whether a network monitoring agent is degraded based at least in part on evaluating high confidence metrics and low confidence metrics. The example method 300 can be performed by a service on the network that checks network monitoring agents (e.g., by degraded agent detector 120).

At 310, an indication of network packet loss by a network monitoring agent is received. For example, the indication can be received by querying or polling the network monitoring agent and/or by the network monitoring agent reporting the indication of network packet loss. The indication of network packet loss can be received by an external service (e.g., by the degraded agent detector 120) or by a local service (e.g., by a service running on the same computing device as the network monitoring agent).

At 320, metrics are obtained. The metrics are associated with monitoring a computer network by the network monitoring agent (e.g., metrics that are associated with the network monitoring agent software itself and/or metrics that are associated with the host on which the network monitoring agent is running). The metrics comprise high confidence metrics and low confidence metrics.

At 330, the obtained metrics are evaluated against thresholds. Each type of metric can have its associated threshold. For example, some metrics can use threshold percentiles based on distributions (e.g., generated automatically from previous metric data). Other metrics can use threshold values or ratios that do not depend on distributions.

At 340, if one of the high confidence metrics is outside of a threshold for the high confidence metric, then a determination is made that network monitoring agent is degraded.

At 350, if at least two of the low confidence metrics are outside of respective thresholds, and if the at least two low confidence metrics associated with other network monitoring agents are inside of the respective thresholds, then a determination is made that network monitoring agent is degraded. In some implementations, the other network monitoring agents are monitoring the same part of the network as the network monitoring agent. For example, if the other network monitoring agents are also seeing the same two low confidence metrics outside of the respective thresholds, then it is more likely a normal operating condition and less likely that the network monitoring agent is degraded.

At 350, based on determining that the network monitoring agent is degraded (at either 340 or 350), monitoring data from the network monitoring agent is discarded. For example, the monitoring data from the degraded network monitoring agent is not used (e.g., not aggregated with monitoring data from the other network monitoring agents) for detecting and triangulating network problems. However, if the network monitoring agent is not determined to be degraded, then the network monitoring agent's monitoring data can be used in detecting network problems.

In some implementations, the operation at 340 is performed first, and if none of the high confidence metrics are outside of their thresholds, then the operation at 350 is performed to evaluate the low confidence metrics. However, the operations can be performed independently or in a different order.

Figure 4:
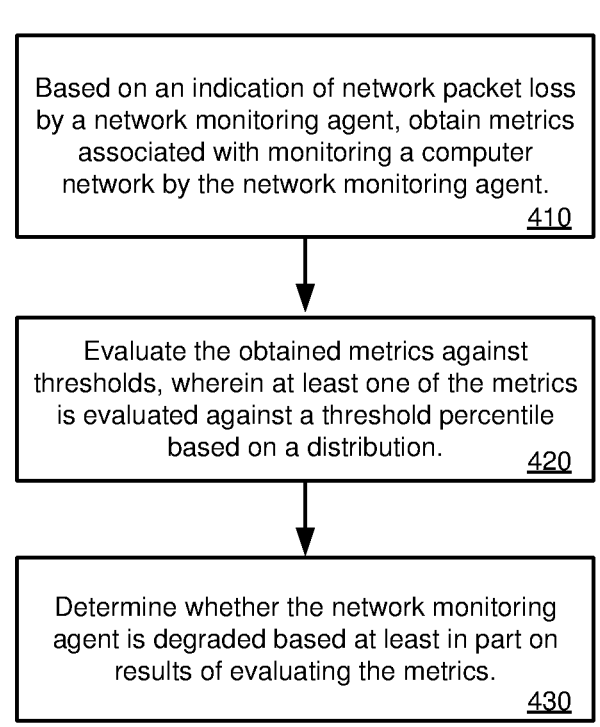

FIG. 4 is a flow chart of an example method 400 for determining whether a network monitoring agent is degraded. The example method 400 can be performed by a service on the network that checks network monitoring agents (e.g., by degraded agent detector 120).

At 410, metrics are obtained based on an indication of network packet loss by a network monitoring agent. The metrics are associated with monitoring a computer network by the network monitoring agent (e.g., metrics that are associated with the network monitoring agent software itself and/or metrics that are associated with the host on which the network monitoring agent is running). The metrics can comprise high confidence metrics and low confidence metrics. The indication of network packet loss can be received by querying or polling the network monitoring agent and/or by the network monitoring agent reporting the indication of network packet loss. The indication of network packet loss can be received by an external service (e.g., by the degraded agent detector 120) or by a local service (e.g., by a service running on the same computing device as the network monitoring agent).

At 420, the obtained metrics are evaluated against thresholds. At least one of the metrics is evaluated against a threshold percentile based on a distribution. Each type of metric can have its associated threshold. For example, some metrics can use threshold percentiles based on distributions. Other metrics can use threshold values or ratios that do not depend on distributions.

At 430, a determination is made as to whether the network monitoring agent is degraded. The determination can be made on the basis of one metric deviating beyond its threshold and/or based on multiple metrics. In some implementations, if one high confidence metric is outside its threshold, then the network monitoring agent is considered degraded. In some implementations, if two low confidence metrics are outside their respective thresholds, and the two low confidence metrics for other network monitoring agents (e.g., monitoring the same part of the network) are inside their respective thresholds, then the network monitoring agent is considered degraded.

If the network monitoring agent is found to be degraded at 430, then monitoring data generated by the network monitoring agent can be discarded. For example, the monitoring data from the degraded network monitoring agent is not used (e.g., not aggregated with monitoring data from the other network monitoring agents) for detecting and triangulating network problems.

Figure 5:
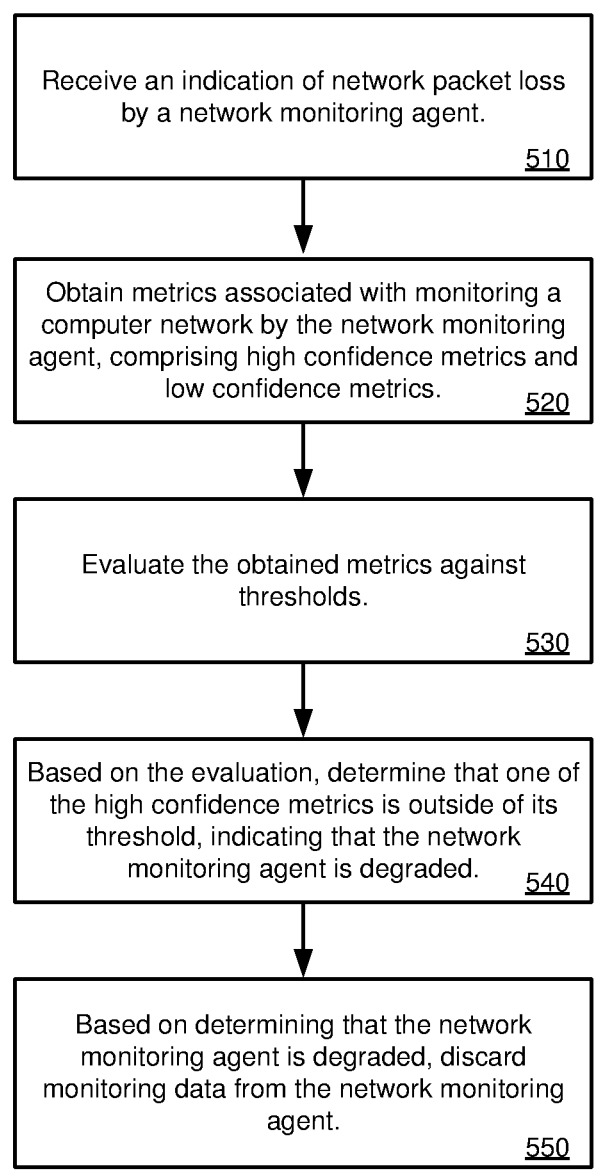

FIG. 5 is a flow chart of an example method 500 for determining whether a network monitoring agent is degraded. The example method 500 can be performed by a service on the network that checks network monitoring agents (e.g., by degraded agent detector 120).

At 510, an indication of network packet loss by a network monitoring agent is received. For example, the indication can be received by querying or polling the network monitoring agent and/or by the network monitoring agent reporting the indication of network packet loss. The indication of network packet loss can be received by an external service (e.g., by the degraded agent detector 120) or by a local service (e.g., by a service running on the same computing device as the network monitoring agent).

At 520, metrics are obtained. The metrics are associated with monitoring a computer network by the network monitoring agent (e.g., metrics that are associated with the network monitoring agent software itself and/or metrics that are associated with the host on which the network monitoring agent is running). The metrics can comprise high confidence metrics and low confidence metrics.

At 530, the obtained metrics are evaluated against thresholds. Each type of metric can have its associated threshold. For example, some metrics can use threshold percentiles based on distributions. Other metrics can use threshold values or ratios that do not depend on distributions.

At 540, a determination is made that one of the high confidence metrics is outside of its threshold, which indicates that the network monitoring agent is degraded. Whether a network monitoring agent is degraded can be determined based on other types of metrics (e.g., in addition to, or instead of, evaluating high confidence metrics), such as by using low confidence metrics.

At 550, based on determining that the network monitoring agent is degraded, monitoring data from the network monitoring agent is discarded. For example, the monitoring data from the degraded network monitoring agent is not used (e.g., not aggregated with monitoring data from the other network monitoring agents) for detecting and triangulating network problems.

Figure 6:
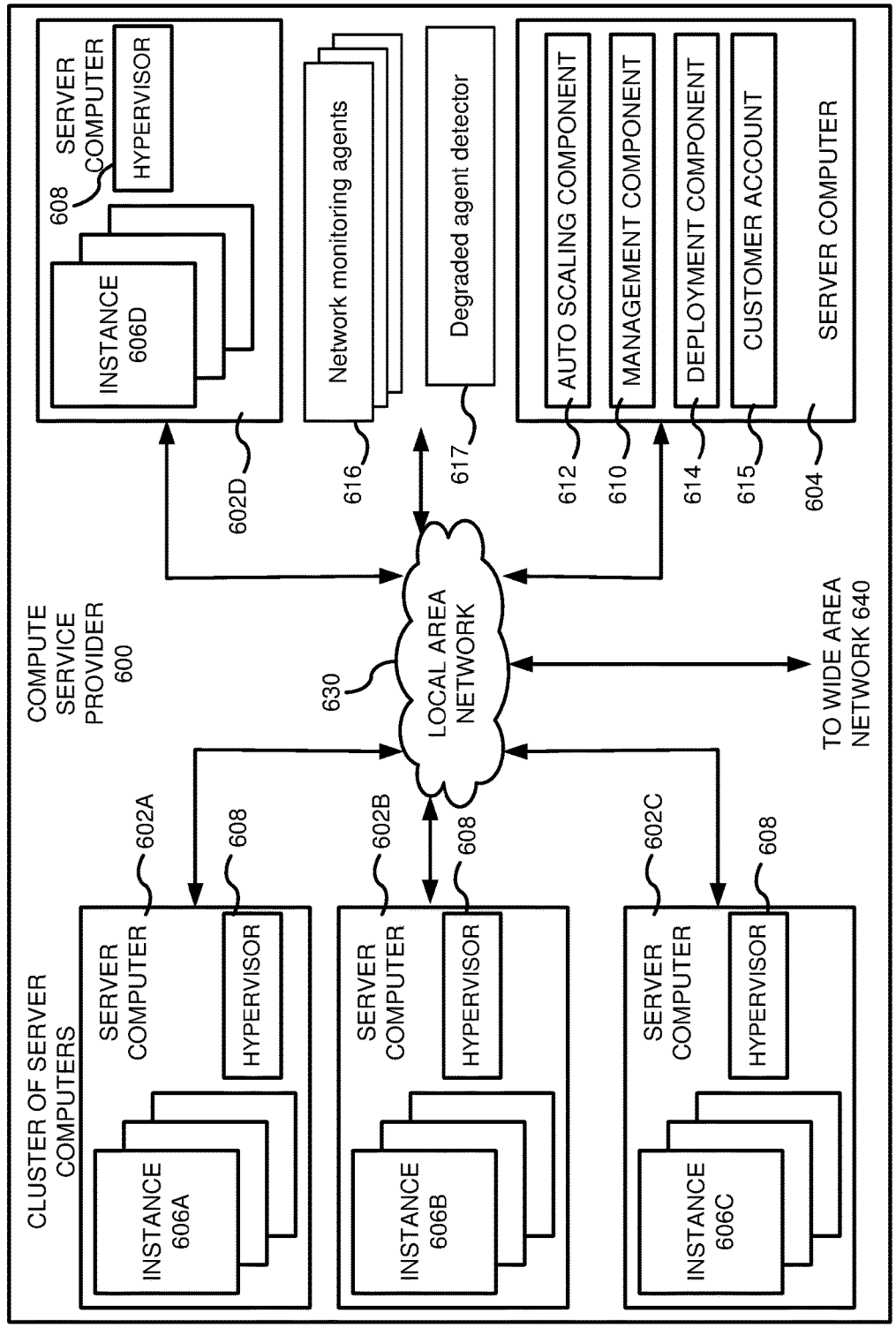
FIG. 6 is an example system diagram showing a plurality of virtual machine instances running in a multi-tenant environment.

FIG. 6 is a computing system diagram of a network-based compute service provider 600 that illustrates one environment in which embodiments described herein can be used. By way of background, the compute service provider 600

(i.e., the cloud provider) is capable of delivery of computing and storage capacity as a service to a community of end recipients. In an example embodiment, the compute service provider can be established for an organization by or on behalf of the organization. That is, the compute service provider 600 may offer a "private cloud environment." In another embodiment, the compute service provider 600 supports a multi-tenant environment, wherein a plurality of customers operate independently (i.e., a public cloud environment). Generally speaking, the compute service provider 600 can provide the following models: Infrastructure as a Service ("IaaS"), Platform as a Service ("PaaS"), and/or Software as a Service ("SaaS"). Other models can be provided. For the IaaS model, the compute service provider 600 can offer computers as physical or virtual machines and other resources. The virtual machines can be run as guests by a hypervisor, as described further below. The PaaS model delivers a computing platform that can include an operating system, programming language execution environment, database, and web server. Application developers can develop and run their software solutions on the compute service provider platform without the cost of buying and managing the underlying hardware and software. The SaaS model allows installation and operation of application software in the compute service provider. In some embodiments, end users access the compute service provider 600 using networked client devices, such as desktop computers, laptops, tablets, smartphones, etc. running web browsers or other lightweight client applications. Those skilled in the art will recognize that the compute service provider 600 can be described as a "cloud" environment.

The particular illustrated compute service provider 600 includes a plurality of server computers 602A-602D. While only four server computers are shown, any number can be used, and large centers can include thousands of server computers. The server computers 602A-602D can provide computing resources for executing software instances 606A-606D. In one embodiment, the instances 606A-606D are virtual machines. As known in the art, a virtual machine is an instance of a software implementation of a machine (i.e. a computer) that executes applications like a physical machine. In the example, each of the servers 602A-602D can be configured to execute a hypervisor 608 or another type of program configured to enable the execution of multiple instances 606 on a single server. For example, each of the servers 602A-602D can be configured (e.g., via the hypervisor 608) to support one or more virtual machine slots, with each virtual machine slot capable of running a virtual machine instance (e.g., server computer 602A could be configured to support three virtual machine slots each running a corresponding virtual machine instance). Additionally, each of the instances 606 can be configured to execute one or more applications.

It should be appreciated that although the embodiments disclosed herein are described primarily in the context of virtual machines, other types of instances can be utilized with the concepts and technologies disclosed herein. For instance, the technologies disclosed herein can be utilized with storage resources, data communications resources, and with other types of computing resources. The embodiments disclosed herein might also execute all or a portion of an application directly on a computer system without utilizing virtual machine instances.

One or more server computers 604 can be reserved for executing software components for managing the operation of the server computers 602 and the instances 606. For example, the server computer 604 can execute a management component 610. A customer can access the management component 610 to configure various aspects of the operation of the instances 606 purchased by the customer. For example, the customer can purchase, rent or lease instances and make changes to the configuration of the instances. The customer can also specify settings regarding how the purchased instances are to be scaled in response to demand. The management component can further include a policy document to implement customer policies. An auto scaling component 612 can scale the instances 606 based upon rules defined by the customer. In one embodiment, the auto scaling component 612 allows a customer to specify scale-up rules for use in determining when new instances should be instantiated and scale-down rules for use in determining when existing instances should be terminated. The auto scaling component 612 can consist of a number of subcomponents executing on different server computers 602 or other computing devices. The auto scaling component 612 can monitor available computing resources over an internal management network and modify resources available based on need.

A deployment component 614 can be used to assist customers in the deployment of new instances 606 of computing resources. The deployment component can have access to account information associated with the instances, such as who is the owner of the account, credit card information, country of the owner, etc. The deployment component 614 can receive a configuration from a customer that includes data describing how new instances 606 should be configured. For example, the configuration can specify one or more applications to be installed in new instances 606, provide scripts and/or other types of code to be executed for configuring new instances 606, provide cache logic specifying how an application cache should be prepared, and other types of information. The deployment component 614 can utilize the customer-provided configuration and cache logic to configure, prime, and launch new instances 606. The configuration, cache logic, and other information may be specified by a customer using the management component 610 or by providing this information directly to the deployment component 614. The instance manager can be considered part of the deployment component.

Customer account information 615 can include any desired information associated with a customer of the multi-tenant environment. For example, the customer account information can include a unique identifier for a customer, a customer address, billing information, licensing information, customization parameters for launching instances, scheduling information, auto-scaling parameters, previous IP addresses used to access the account, etc.

A network 630 can be utilized to interconnect the server computers 602A-602D and the server computer 604. The network 630 can comprise a Clos network. The network 630 can be a local area network (LAN), such as a multi-tiered network (e.g., Clos network), and can be connected to a wide area network (WAN) 640 so that end users can access the compute service provider 600. The wide area network 640 can connect to a border network fabric providing access to the internet and/or to other networks (e.g., peering connections to other network locations). It should be appreciated that the network topology illustrated in FIG. 6 has been simplified and that many more networks and networking devices can be utilized to interconnect the various computing systems disclosed herein.

In some implementations, network monitoring agents 616 monitor the computer network in order to detect and locate problems on the network. For example, the network monitoring agents 616 can be implemented as software agents running on host computers. The network monitoring agents 616 can monitor the network using test packets (e.g., ping and/or traceroute packets) in order to detect problems on the network (e.g., problems within the local network 630 and/or other networks that are accessible via the wide area network 640). In some implementations, a degraded agent detector 617 evaluates the network monitoring agents 616 to determine whether the any of the network monitoring agents are degraded.

Figure 7:
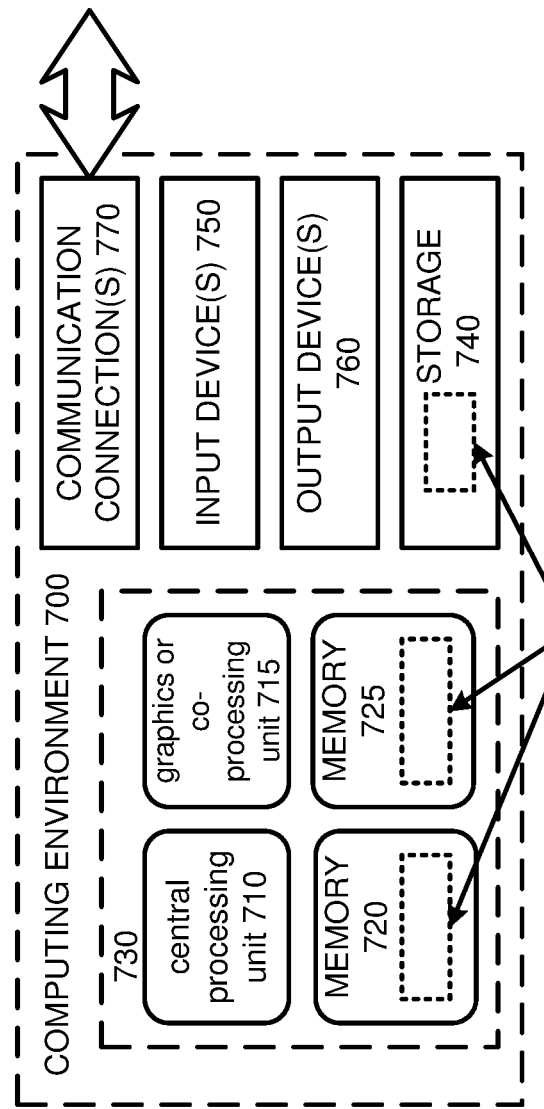
FIG. 7 depicts a generalized example of a suitable computing environment in which the described innovations may be implemented.

FIG. 7 depicts a generalized example of a suitable computing environment 700 in which the described innovations may be implemented. The computing environment 700 is not intended to suggest any limitation as to scope of use or functionality, as the innovations may be implemented in diverse general-purpose or special-purpose computing systems. For example, the computing environment 700 can be any of a variety of computing devices (e.g., desktop computer, laptop computer, server computer, tablet computer, etc.)

With reference to FIG. 7, the computing environment 700 includes one or more processing units 710, 715 and memory 720, 725. In FIG. 7, this basic configuration 730 is included within a dashed line. The processing units 710, 715 execute computer-executable instructions. A processing unit can be a general-purpose central processing unit (CPU), processor in an application-specific integrated circuit (ASIC), or any other type of processor. A processing unit can also comprise multiple processors. In a multi-processing system, multiple processing units execute computer-executable instructions to increase processing power. For example, FIG. 7 shows a central processing unit 710 as well as a graphics processing unit or co-processing unit 715. The tangible memory 720, 725 may be volatile memory (e.g., registers, cache, RAM), non-volatile memory (e.g., ROM, EEPROM, flash memory, etc.), or some combination of the two, accessible by the processing unit(s). The memory 720, 725 stores software 780 implementing one or more innovations described herein, in the form of computer-executable instructions suitable for execution by the processing unit(s).

A computing system may have additional features. For example, the computing environment 700 includes storage 740, one or more input devices 750, one or more output devices 760, and one or more communication connections 770. An interconnection mechanism (not shown) such as a bus, controller, or network interconnects the components of the computing environment 700. Typically, operating system software (not shown) provides an operating environment for other software executing in the computing environment 700, and coordinates activities of the components of the computing environment 700.

The tangible storage 740 may be removable or non-removable, and includes magnetic disks, magnetic tapes or cassettes, CD-ROMs, DVDs, or any other medium which can be used to store information in a non-transitory way and which can be accessed within the computing environment 700. The storage 740 stores instructions for the software 780 implementing one or more innovations described herein.

The input device(s) 750 may be a touch input device such as a keyboard, mouse, pen, or trackball, a voice input device, a scanning device, or another device that provides input to the computing environment 700. The output device(s) 760 may be a display, printer, speaker, CD-writer, or another device that provides output from the computing environment 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (i.e., any available computing device, including smart phones or other mobile devices that include computing hardware). The term computer-readable storage media does not include signals and carrier waves, and does not include communication connections. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, or any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. Therefore, what is claimed as the invention is all that comes within the scope of these claims.

What is claimed is:

1. A method, implemented by a computing system, the method comprising:
    receiving an indication of network packet loss by a network monitoring agent, and based upon the indication of network packet loss:
        obtaining metrics associated with monitoring a computer network by the network monitoring agent, wherein the metrics measure distinct aspects of software and/or hardware associated with running the network monitoring agent, wherein the metrics comprise both:
            high confidence metrics, wherein high confidence metrics are types of monitoring data that indicate a degraded network monitoring agent with a high degree of confidence; and
            low confidence metrics, wherein low confidence metrics are types of monitoring data that indicate a degraded network monitoring agent with a low degree of confidence;
            wherein the metrics are categorized as high confidence metrics and low confidence metrics; and
            wherein each low confidence metric and each high confidence metric is a distinct metric that measures a different type of monitoring data;
        evaluating the obtained metrics against thresholds;
        if one of the high confidence metrics is outside of a threshold for the high confidence metric, determining that the network monitoring agent is degraded;
        otherwise, if two of the low confidence metrics are outside of respective thresholds for the two low confidence metrics, and if the two low confidence metrics associated with other network monitoring agents are inside of the respective thresholds, determining that the network monitoring agent is degraded; and
        based on determining that the network monitoring agent is degraded, discarding monitoring data received from the network monitoring agent.

2. The method of claim 1, wherein an obtained metric is outside of its associated threshold when the obtained metric is outside of a threshold percentile.

3. The method of claim 2, wherein the threshold percentile is determined for a distribution generated from previous values, associated with the network monitoring agent, of the obtained metric for a pervious time period.

4. The method of claim 1, wherein the threshold for the high confidence metric and the thresholds for the two low confidence metrics are threshold percentiles determined from normal distributions or Poisson distributions.

5. The method of claim 1, wherein the high confidence metrics comprise:
    a measure of a number of dropped network packets; or
    a ratio of network packet send requests to callbacks.

6. The method of claim 1, wherein the low confidence metrics comprise:
    a measure of a number of context switches;
    a measure of network packet latency;
    a measure of network packet cycle duration;
    a measure of processor utilization; or
    a measure of memory utilization.

7. The method of claim 1, wherein the other network monitoring agents are monitoring a same part of the computer network as the network monitoring agent.

8. The method of claim 1, wherein the metrics comprise both of:
    an application metric that is related to the software associated with the network monitoring agent; and
    a host metric that is associated with the hardware of a computing device on which the network monitoring agent is running.

9. A computing device comprising:
    a processing unit; and
    a network interface;
    wherein the computing device is configured to perform operations, the operations comprising:
        based upon an indication of network packet loss by a network monitoring agent:
            obtaining metrics associated with monitoring a computer network by the network monitoring agent, wherein the metrics measure distinct aspects of software and/or hardware associated with running the network monitoring agent, wherein the metrics comprise:
                a high confidence metric, wherein high confidence metrics are types of monitoring data that indicate a degraded network monitoring agent with a high degree of confidence; and
                low confidence metrics, wherein low confidence metrics are types of monitoring data that indicate a degraded network monitoring agent with a low degree of confidence;
                wherein the metrics are categorized as high confidence metrics and low confidence metrics; and
                wherein each low confidence metric and each high confidence metric is a distinct metric that measures a different type of monitoring data;
            evaluating the metrics against thresholds, wherein one of the metrics is outside of its threshold when the one metric is outside of a threshold percentile that is evaluated using a distribution of the metric;
            determining whether the network monitoring agent is degraded based on results of evaluating the metrics; and
            as a result of determining that the network monitoring agent is degraded, discarding monitoring data from the network monitoring agent.

10. The computing device of claim 9, the operations further comprising:

evaluating the high confidence metric against a threshold for the high confidence metric; and as a result of determining that the high confidence metric is outside of the threshold, determining that the network monitoring agent is degraded.

11. The computing device of claim 10, wherein the high confidence metric is:

a measure of a number of dropped network packets; or a ratio of network packet send requests to callbacks.

12. The computing device of claim 9, the operations further comprising:

evaluating the low confidence metrics against respective thresholds for the low confidence metrics; and as a result of determining that two of the low confidence metrics are outside of the respective thresholds for the two low confidence metrics, and if the two low confidence metrics associated with other network monitoring agents are inside of the respective thresholds, determining that the network monitoring agent is degraded.

13. The computing device of claim 12, wherein the other network monitoring agents are monitoring a same part of a computer network as the network monitoring agent.

14. The computing device of claim 12, wherein the low confidence metrics comprise:

a measure of a number of context switches;

a measure of network packet latency;

a measure of network packet cycle duration;

a measure of processor utilization; or a measure of memory utilization.

15. The computing device of claim 9, the operations further comprising:

receiving, from the network monitoring agent, an indication of network packet loss, wherein the indication of network packet loss is determined when packet loss experienced by the network monitoring agent is above a threshold value for a period of time.

16. The computing device of claim 9, the operations further comprising:

as a result of determining that the network monitoring agent is not degraded, using monitoring data from the network monitoring agent, along with monitoring data from other network monitoring agents, to triangulate network problems within the computer network.

17. A method, implemented by a computing system, the method comprising:

receiving an indication of network packet loss by a network monitoring agent, and based upon the indication of network packet loss:

obtaining metrics associated with monitoring a computer network by the network monitoring agent, wherein the metrics measure distinct aspects of software and/or hardware associated with running the network monitoring agent, wherein the metrics comprise:

high confidence metrics, wherein high confidence metrics are types of monitoring data that indicate a degraded network monitoring agent with a high degree of confidence; and low confidence metrics, wherein low confidence metrics are types of monitoring data that indicate a degraded network monitoring agent with a low degree of confidence;

wherein the metrics are categorized as high confidence metrics and low confidence metrics; and wherein each low confidence metric and each high confidence metric is a distinct metric that measures a different type of monitoring data;

evaluating the obtained metrics against thresholds;

based on the evaluation, determining that one of the high confidence metrics is outside of a threshold for the high confidence metric, indicating that the network monitoring agent is degraded; and based on determining that the network monitoring agent is degraded, discarding monitoring data received from the network monitoring agent.

18. The method of claim 17, further comprising:

based on the evaluation, determining that two of the low confidence metrics are outside of respective thresholds for the at least two low confidence metrics, and the two low confidence metrics associated with other network monitoring agents are inside of the respective thresholds, indicating that the network monitoring agent is degraded.

19. The method of claim 17, wherein the metrics comprise:

an application metric that is related to the software associated with the network monitoring agent; and a host metric that is associated with the hardware of a computing device on which the network monitoring agent is running.

* * * * *

UNITED STATES PATENT AND TRADEMARK OFFICE
CERTIFICATE OF CORRECTION

PATENT NO. : 10,999,132 B1
APPLICATION NO. : 15/793477
DATED : May 4, 2021
INVENTOR(S) : Sagar et al.

Page 1 of 1

It is certified that error appears in the above-identified patent and that said Letters Patent is hereby corrected as shown below:

In the Claims

Column 16, Line 4, Claim 3 "pervious" should read --previous--.

Signed and Sealed this
Thirtieth Day of November, 2021

Drew Hirshfeld
*Performing the Functions and Duties of the*
*Under Secretary of Commerce for Intellectual Property and*
*Director of the United States Patent and Trademark Office*